United States Patent [19]

Maschino

[11] Patent Number: 4,975,564
[45] Date of Patent: Dec. 4, 1990

[54] ODOMETER

[75] Inventor: Dale C. Maschino, Kokomo, Ind.

[73] Assignee: Delco Electronics Corporation, Kokomo, Ind.

[21] Appl. No.: 511,365

[22] Filed: Apr. 19, 1990

[51] Int. Cl.⁵ ............................................. G01C 22/00
[52] U.S. Cl. ................................... 235/96; 235/95 R; 235/117 R
[58] Field of Search ..................... 235/95 R, 96, 117 R

[56] References Cited

U.S. PATENT DOCUMENTS

| | | | |
|---|---|---|---|
| 3,137,444 | 6/1964 | Harada | 235/117 R |
| 3,667,671 | 6/1972 | Hachtel | 235/96 |
| 3,785,551 | 1/1974 | Regan | 235/95 R |
| 3,965,847 | 6/1976 | Deming | 235/95 R X |
| 4,841,130 | 6/1989 | Maschino | 235/96 |

Primary Examiner—Benjamin R. Fuller
Attorney, Agent, or Firm—Ronald L. Phillips

[57] ABSTRACT

An odometer wheel assembly has a retainer cooperating with a groove in an end disc of the assembly to automatically establish end play in the wheel assembly by the difference between two accurately controlled component dimensions.

3 Claims, 1 Drawing Sheet

U.S. Patent  Dec. 4, 1990  4,975,564
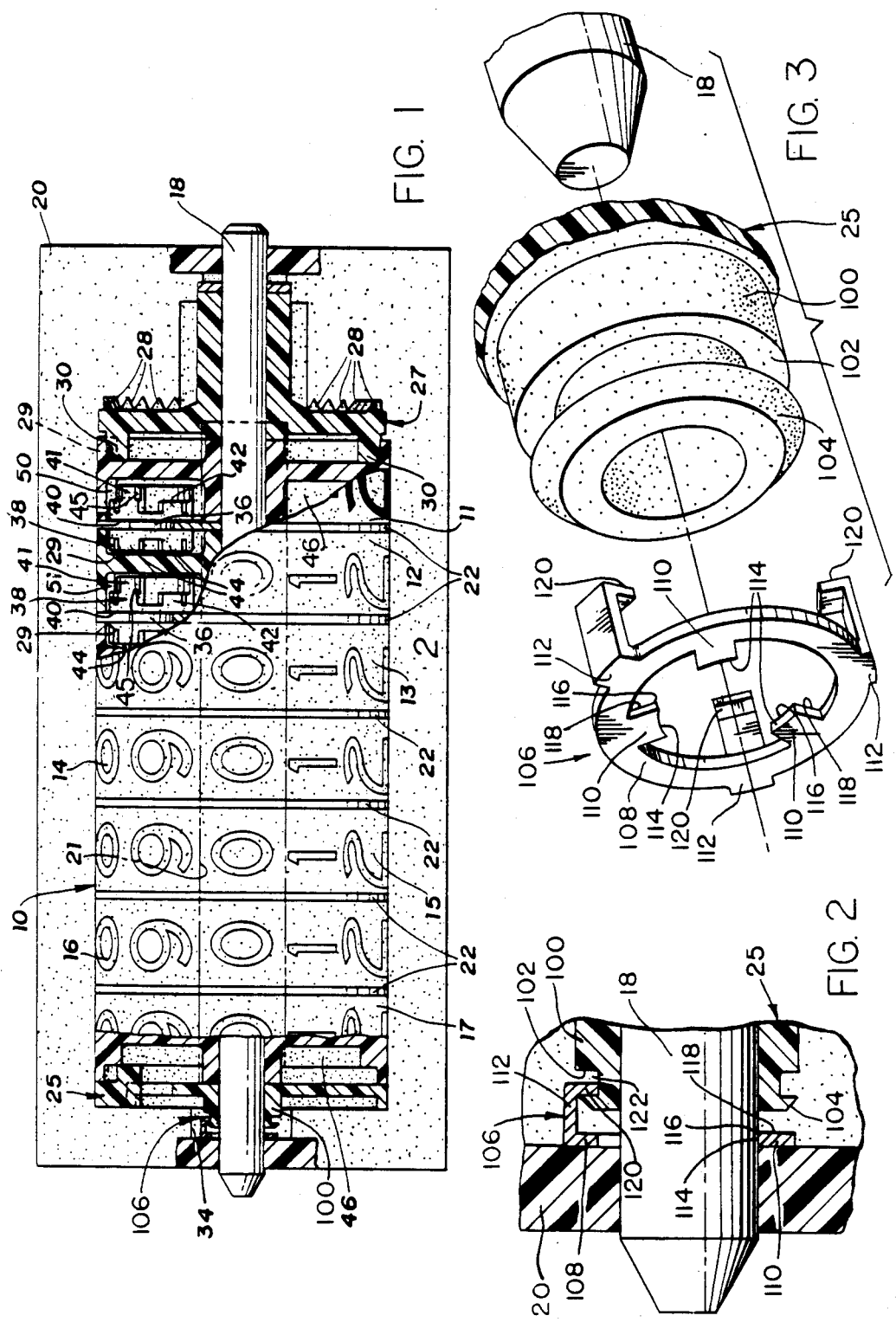

ODOMETER

FIELD OF THE INVENTION

This invention relates to odometers and more particularly to controlling the end play in wheel-type odometers for use in motor vehicles to register the distance traveled.

BACKGROUND OF THE INVENTION

In wheel-type odometers such as those used in motor vehicles to register the distance traveled, there is commonly employed a plurality of number wheels that are rotatably mounted on a drive shaft and are driven by a drive wheel fixed to the shaft and in proper additive sequence by planetary gear sets interposed between adjacent ones of the gears. To ensure that these gears remain in mesh yet are not tightly pressed such as to cause binding, there is commonly provided either a predetermined clearance (end play) in the wheel assembly relative to the drive wheel or a spring-loaded end play control arrangement that is typically comprised of a coil spring located between a pressed on washer and the wheel assembly. Typically, the wheels and the drive gear are plastic parts whose shrinkage can vary with their molding temperature and whose reversible expansion and contraction with ambient temperature extremes is significant as compared to the gear mesh dimension. As a result, their tolerance stack up is difficult to control and they thus require either a clearance washer fit or a spring-loaded type end play arrangement to produce the desired end play allowance. In either case, there is required selective fit to provide either a finite amount of end play or a predetermined light spring-load since in the latter case this spring-load is desirably maintained low so as not to incur inordinate frictional drag in the drive system.

SUMMARY OF THE INVENTION

The present invention offers a cost effective way of establishing a predetermined end clearance so as to minimize the frictional drag and without requiring any selective fit. This is accomplished in the preferred embodiment with a simple modification to the drive shaft and end disc that is normally used to just block off light but may also be employed to prevent odometer droop as disclosed in U.S. Pat. No. 4,841,130 assigned to the assignee of this invention. Instead of a spring that loads the wheel assembly, there is provided a resilient snap on retainer that snaps into a groove on one end of the drive shaft and has spring fingers whose ends engage an annular groove added to a hub formed on the above mentioned end disc. The width of the groove is determined in relation to the axial extent of the tip of the spring fingers such that when the retainer is pushed onto the shaft and used to press the wheel assemblies into contact, it is thereafter held thereon by burrs formed from its stamping while its finger ends which are trapped in the groove on the end disc control the end play by virtue of axial clearance provided in the groove in which they are received. And thus the odometer end play is established by the difference between two accurately controllable component dimensions; namely, a groove and the stock thickness of the retainer.

It is therefore an object of the present invention to provide a new and improved end play arrangement for an odometer.

Another object is to provide for the control of end play in an odometer utilizing accurately controllable component dimensions.

Another object is to provide in an odometer a retainer that operates in a groove on an end disc of the odometer assembly to retain the odometer wheels together and establish a precise end play therein.

Another object is to provide a highly cost effective solution to establishing a precise amount of end play in an odometer.

BRIEF DESCRIPTION OF THE DRAWINGS

These and other objects, advantages and features of the present invention will become more apparent from the following description and drawing in which:

FIG. 1 is a side view with parts broken away of an odometer the preferred embodiment of the present invention.

FIG. 2 is an enlarged view of the left end of the odometer in FIG. 1 showing the end play control arrangement.

FIG. 3 is an exploded view of the end play arrangement in FIGS. 1 and 2.

DESCRIPTION OF THE PREFERRED EMBODIMENT

Referring to FIG. 1, the odometer wheel assembly there shown and generally identified as 10 has a 100,000 mile plus one decimal read out provided by a decimal wheel 11 and six digital wheels 12–17 which all have the numbers 0–9 printed thereon. The numeral wheels 11–17, which are all identical in construction and are preferably plastic molded parts, are coaxially mounted for rotation on a shaft 18 that is rotatably supported in a frame 20 having a viewing aperture 21 (shown in phantom line) through which a line of the numerals across the wheels may be viewed to read the mileage. In addition, there are also mounted on the shaft coaxial with the wheels, six identical stamped sheet metal pinion carrier plates 22 mounted between adjacent ones of the wheels, a plastic molded end disc 25 at the left end adjacent the highest counting wheel 17 and a plastic molded drive disc 27 at the opposite end adjacent the decimal wheel 11. The drive disc 27 is pressed-fitted on the shaft 18 and has teeth 28 about its exposed side by means of which it and thereby the shaft may be driven at reduced speed by an electric motor or shaft drive gear (not shown). In addition, the decimal wheel 11 has twenty (20) internal teeth 29 as does the digit wheels as later described. These teeth are engaged between two diametrically opposed pins thereof by a correspondingly arranged pair of drive lugs 30 on the drive disc so the decimal wheel is driven by and turns conjointly therewith.

The pinion carriers 22 freely receive the shaft 18 and each have a tab (not shown) that fits into a longitudinal channel 34 in the odometer frame to angularly locate and prevent the respective carrier from turning. The carriers 22 further have two carrier support notches 36, only one of which is used, and the other facilitating assembly. A pinion gear 38 is provided between each adjacent set of wheels and has an annular groove 40 by which it is rotatably supported in one of the notches 36 of the carrier between these wheels. Each pinion gear 38 has three locking teeth 41 and six transfer teeth 42 on one side and six drive teeth 44 on the other side. The locking teeth 41 are extensions of alternate ones of the transfer teeth and have beveled tips 45 that fit into a locking ring 46 on the left side of each wheel. The locking teeth are sequentially indexed into and out of a locking notch (not shown) in the associated ring by a single internal transfer tooth 50 in this same side of the wheel in the case of the decimal wheel 11 or a pair of internal transfer teeth 51 in the case of all the digit wheels 12-17. The internal teeth 50 and 51 are outward of their associated locking ring and, in either case, intermittently engage one of the transfer teeth 42 on the respective pinion during each rotation of the associated wheel to thereby index or turn the pinion one-third turn while the locking teeth are then indexed free of the locking notch. These events are then repeated as the wheel continues to turn and with the angular location of the carrier tabs to the frame and that of the internal teeth 50 and 51 to the wheel numerals positioned to lock the wheels in advanced or increased mileage positions of correct reading relative to the viewing aperture.

Such incremental digit wheel advancement is caused by the drive teeth 44 on each pinion gear engaging the twenty internal tooth ring gear 29 formed on the right side of each wheel so that ten turns of a lower digit wheel causes one turn of the immediately higher digit wheel to the immediate left thereof. The odometer assembly thus far disclosed except for the end play now to be described is similar to that disclosed in U.S. Pat. Nos. 3,137,444; 3,965,847 and 4,841,130 assigned to the assignee of this invention and which are hereby incorporated by reference and to which reference is made for further understanding of the various features and also possible alternative designs. To help understand the present invention, it is particularly relevant to know that in such prior arrangements they commonly have either spring-loaded end play control or a designed in amount of end clearance which is attempted to be controlled by a tolerancing of the stack up of the parts. Preferably, there should be no frictional load such as applied by a spring and instead the wheels should be substantially free to rotate relative to each other but yet not be able to move so far axially as to affect the respective gear engagements between adjacent wheels, e.g., prevent gear disengagement.

According to the present invention, the end disc 25, which is also called an "extension wheel", is formed with a center hub 100 on its outboard side. An annular groove 102 is formed on the hub and, in addition, a taper 104 is provided at the end thereof as best seen in FIGS. 2 and 3. A combination wheel assembly retainer and automatic end play clearance establishment member 106 is provided which is preferably formed as a sheet metal stamping. The member 106 has an annular base section 108 from which three equally angularly spaced radially inwardly extending retention tangs 110 depend and from which three radially outwardly extending end play control tangs 112 also depend that are angularly located intermediate the interior tangs. In the stamping of the member 106, the ends 114 of the retention tangs 110 are left with a burr 116 on their wheel assembly or inner side 118. And it is on this side that the radially outwardly located end play control tangs are bent over into a U-shape such that they will constitute fingers 120 that are adapted to radially extend into the groove 102 on the disc hub as will now be explained.

The retainer 106 is assembled by being pressed on the shaft 18 with a suitable annular tool to a point where the tips of the fingers 120 of the end play tangs 112 are brought into engagement with the taper 104 on the disc hub. Further forced movement has the taper acting as a cam to force the fingers backward and radially outward until they reach the groove at which time they are then allowed thereby to return to their normal condition wherein they then extend into the groove and thereby trap the member 106 and end disc 25 together. Meantime, the member 106 has slid along the shaft and upon removal of the applied load, the burrs 116 on the tips of the retention tangs 110 grasp the shaft to retain the member 106 in that position on the shaft and prevent its removal. The retainer with the fingers in the hub on the end disc is continued to be pressed forward until all the adjacent numeral wheels are brought into contact with each other.

The thickness of the fingers 120, i.e., that of the stock material, is less than the axial width of the groove 102 and this difference is set equal to the end clearance (end play) 122 desired. Thus, upon removal of the assembly force on the retainer and with the retainer left in position on the shaft, the wheel assembly is permitted to move leftward through this clearance or end play to allow relatively free rotational movement of the wheels but prevent such relative axial movement as would allow disengagement or otherwise adversely affect operation of any one of the planetary gear sets. For example, it has been found possible to control the thickness of the retainer stock to $+/-0.010$ mm and the width of the groove to $+/-0.050$ mm. This allows a clearance between them which sets the odometer wheel end play to a range of 0.28 mm to 0.40 mm maximum which range is not readily accomplished with currently existing designs. And thus the odometer end play 122 is established by the difference between two accurately controlled component dimensions which heretofore was left to the tolerance stack up of the plastic wheels and various many other components.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. In an odometer assembly comprising a drive shaft, a plurality of numeral wheels rotatably supported on the shaft, gear means between adjacent ones of the wheels for transmitting drive from one to the other so that the wheels provide an accumulative read out, the improvement comprising an end member slidably mounted on said shaft adjacent an outboard one of said wheels, and a retainer having means for releasably grasping the shaft and also having retaining means for retainably engaging said end member and pressing said wheels together as an assembly through an applied force on said retainer whereby said end member is retained on said shaft on release of the applied force, and means on said end member for cooperating with said retaining means so as to allow limited movement of said end member along said shaft and thereby effect a predetermined end play in said wheel assembly.

2. In an odometer assembly comprising a drive shaft, a plurality of numeral wheels rotatably supported on the shaft, gear means between adjacent ones of the wheels for transmitting drive from one to the other so that the wheels provide an accumulative read out, the improvement comprising an end member slidably mounted on said shaft adjacent an outermost one of said wheels, said end member having a hub with an annular groove therein and also a cam at an end thereof, and a retainer having radially inwardly extending tang means for releasably grasping the shaft and also having radially outwardly extending tang means having fingers deflectable by said cam so as to extend over said hub and then relax into said groove while pressing said wheel assembly together through an applied force on said retainer whereby said end member is retained on said shaft on release of the applied force, and said fingers having a thickness less than a width of said groove by an amount equal to a desired end play for the wheel assembly thereby to effect said end play in said wheel assembly.

3. In an odometer assembly comprising a drive shaft, a plurality of numeral wheels rotatably supported on the shaft, gear means between adjacent ones of the wheels for transmitting drive from one to the other so that the wheels provide an accumulative read out, the improvement comprising an end disc slidably mounted on said shaft adjacent an outboard one of said wheels, said end disc having a center hub with an annular groove therein and also a taper at an end thereof, and a retainer having radially inwardly extending tang means for releasably grasping the shaft and also having radially outwardly extending tang means having fingers deflectable by said taper so as to extend over said hub and then relax into said groove while pressing said wheels together as an assembly through an applied force on said retainer whereby said end disc is retained on said shaft on release of the applied force, and said fingers having a thickness less than a width of said groove by an amount equal to a desired end play for the wheel assembly thereby to allow limited movement of said end disc along said shaft and thus effect said end play in said wheel assembly.

* * * * *